US00RE49248E

(19) United States
(12) Reissued Patent
Gosselin et al.

(10) Patent Number: US RE49,248 E
(45) Date of Reissued Patent: Oct. 18, 2022

(54) DESKTOP LASER CUTTER

(71) Applicant: Glowforge Inc., Seattle, WA (US)

(72) Inventors: Mark Gosselin, Seattle, WA (US); Anna-Pia Slothower, Sausalito, CA (US); Erich Slothower, Sausalito, CA (US); John Plunkett, Sausalito, CA (US)

(73) Assignee: Glowforge Inc., Seattle, WA (US)

(21) Appl. No.: 29/787,221

(22) Filed: Jun. 4, 2021

Related U.S. Patent Documents

Reissue of:

(64) Patent No.: Des. 850,528
Issued: Jun. 4, 2019
Appl. No.: 29/586,721
Filed: Dec. 6, 2016

U.S. Applications:

(62) Division of application No. 29/540,496, filed on Sep. 24, 2015, now Pat. No. Des. 827,705.

(51) LOC (13) Cl. ..... 18-04

(52) U.S. Cl.
USPC ..... D18/34.3; D18/50

(58) Field of Classification Search
USPC ..... D18/36, 43, 39, 47, 34.3, 50, 56, 59; D9/414, 419, 430, 431; D14/498, 500; D23/364, 365; D15/127
(Continued)

(56) References Cited

U.S. PATENT DOCUMENTS 2,654,794 A 10/1953 Zaugg
D197,096 S * 12/1963 Gugelot ..... D18/36
(Continued)

OTHER PUBLICATIONS

Mike Shouts—Laser Cutter, announced Sep. 25, 2017 [online], [site visited Oct. 24, 2017]. 3 pages. Available from internet, URL: <https:// mikeshouts.com/the-dremel-digilab-laser-cutter/>.
(Continued)

*Primary Examiner* — Philip S Hyder
(74) *Attorney, Agent, or Firm* — Lee Sullivan Shea & Smith LLP

(57) CLAIM

The ornamental design for a desktop laser cutter, as shown and described.

DESCRIPTION

*The present application is an application for reissue of U.S. Pat. No. D. 850,528, issued on Jun. 4, 2019, which corresponds to U.S. patent application Ser. No. 29/586,721, and is a divisional application of U.S. Pat. No. D. 827,705, issued on Sep. 4, 2018, which corresponds to U.S. patent application Ser. No. 29/540,496, the entire contents of each of which are incorporated herein by reference.*

FIG. 1 is a top-left perspective view showing an embodiment of the desktop laser cutter;
FIG. 2 is a right side elevational view thereof;
FIG. 3 is a left side elevational view thereof;
FIG. 4 is a front elevational view thereof;
FIG. 5 is a rear elevational view thereof;
FIG. 6 is a top plan view thereof; and
FIG. 7 is a bottom plan view thereof.
FIG. 8 is a top-left perspective view showing a second embodiment of the combined desktop laser cutter and filter;
FIG. 9 is a right side elevational view thereof;
FIG. 10 is a left side elevational view thereof;
FIG. 11 is a front elevational view thereof;
FIG. 12 is a rear elevational view thereof;
FIG. 13 is a top plan view thereof; and,
FIG. 14 is a bottom plan view thereof.
The broken lines in the drawings illustrate environment and portions of the desktop laser cutter, which form no part of the claimed design.
*The oblique line shading in the perspective views and the top plan views illustrate transparent surfaces.*

1 Claim, 14 Drawing Sheets

Matter enclosed in heavy brackets [ ] appears in the original patent but forms no part of this reissue; matter printed in italics indicates the additions made by reissue.

(AMENDED)

(58) Field of Classification Search
CPC .. B23K 26/38; B23K 37/0276; B23K 26/362; B23K 26/0823; B23K 26/042; B23K 26/128; G03G 15/0836; G03G 15/0837; G03G 15/0867; G03G 15/0832; G03G 15/0834; G03G 15/0877; G03G 15/0868; G03G 15/50; G03G 15/0872; G03G 15/0898; G03G 15/5016; G03G 15/60; G03G 15/65
See application file for complete search history.

(56) References Cited

U.S. PATENT DOCUMENTS

| | | | | | |
|---|---|---|---|---|---|
| D241,821 | S | | 10/1976 | Jewell | |
| 4,192,062 | A | | 3/1980 | Balde et al. | |
| D264,791 | S | | 6/1982 | Conti | |
| 4,387,949 | A | | 6/1983 | Haitmanek | |
| 4,463,998 | A | | 8/1984 | Reavis et al. | |
| D281,247 | S | | 11/1985 | Lahey et al. | |
| D286,639 | S | | 11/1986 | Strand | |
| D290,091 | S | | 6/1987 | Ware et al. | |
| D293,082 | S | | 12/1987 | Butler | |
| 4,723,857 | A | | 2/1988 | Yokoi | |
| D295,186 | S | | 4/1988 | Hadtke | |
| D336,918 | S | | 6/1993 | Yonezawa et al. | |
| D343,754 | S | | 2/1994 | Pierce et al. | |
| 5,694,295 | A | | 12/1997 | Mochizuki et al. | |
| D413,919 | S | | 9/1999 | Kobayashi et al. | |
| D439,608 | S | | 3/2001 | Gassett et al. | |
| D462,087 | S | * | 8/2002 | Dwyer | D18/55 |
| D465,600 | S | | 11/2002 | Dolan | |
| D468,765 | S | | 1/2003 | Kobayashi et al. | |
| 6,580,388 | B1 | * | 6/2003 | Stoyanov | G01S 7/411 342/192 |
| D488,352 | S | | 4/2004 | Tisdale et al. | |
| D489,754 | S | | 5/2004 | Akahane et al. | |
| D491,220 | S | | 6/2004 | Whitehorn et al. | |
| D493,913 | S | | 8/2004 | Kwok | |
| D501,503 | S | | 2/2005 | Leong et al. | |
| D519,151 | S | * | 4/2006 | Tashiro | D18/54 |
| D523,841 | S | * | 6/2006 | Van Kastel | D14/188 |
| D536,373 | S | * | 2/2007 | Inoue | D18/55 |
| D544,907 | S | | 6/2007 | Tjin Wong Joe et al. | |
| D552,167 | S | | 10/2007 | Lee et al. | |
| D558,266 | S | | 12/2007 | Falk | |
| D558,822 | S | * | 1/2008 | Smith | D18/55 |
| D562,126 | S | | 2/2008 | Kienemund-Paroll | |
| D574,360 | S | * | 8/2008 | Matsuoka | D14/168 |
| D575,635 | S | | 8/2008 | Rozenzweig | |
| D585,427 | S | * | 1/2009 | Lee | D14/204 |
| D589,876 | S | | 4/2009 | Hong et al. | |
| D599,736 | S | * | 9/2009 | Ferber | D13/108 |
| D600,745 | S | | 9/2009 | Inoue et al. | |
| D603,894 | S | | 11/2009 | Yamano et al. | |
| D607,506 | S | | 1/2010 | Kim et al. | |
| D610,589 | S | | 2/2010 | Chia et al. | |
| D614,234 | S | * | 4/2010 | Ishikawa | D18/55 |
| 7,784,782 | B2 | | 8/2010 | Cook et al. | |
| D624,639 | S | * | 9/2010 | Dilorenzo | D23/365 |
| D641,395 | S | * | 7/2011 | Park | D18/55 |
| D643,301 | S | | 8/2011 | Consylman | |
| D649,236 | S | | 11/2011 | Bilko et al. | |
| D661,346 | S | | 6/2012 | Suzuki et al. | |
| D665,445 | S | | 8/2012 | Emmenegger et al. | |
| D666,088 | S | | 8/2012 | Anderson et al. | |
| D667,050 | S | | 9/2012 | Takeuchi | |
| D669,473 | S | * | 10/2012 | Gronau | D14/420 |
| D670,885 | S | * | 11/2012 | Merrick | D99/37 |
| D674,010 | S | | 1/2013 | Nanno | |
| D681,107 | S | | 4/2013 | Larson et al. | |
| D682,329 | S | * | 5/2013 | Day | D15/146 |
| D684,465 | S | | 6/2013 | Vernon et al. | |
| D699,726 | S | | 2/2014 | Seki et al. | |
| D700,840 | S | | 3/2014 | Vernon et al. | |
| D706,269 | S | * | 6/2014 | Qian | D14/422 |
| D708,229 | S | | 7/2014 | Onoue et al. | |
| D716,428 | S | * | 10/2014 | Farone | D23/364 |
| 8,909,085 | B2 | * | 12/2014 | Short | G03G 15/6552 399/81 |
| D723,562 | S | | 3/2015 | Inada et al. | |
| D727,328 | S | * | 4/2015 | Nanno | D14/421 |
| D727,790 | S | | 4/2015 | Ramadan | |
| D730,942 | S | * | 6/2015 | Wong | D14/203.1 |
| D735,310 | S | * | 7/2015 | Drew | D23/365 |
| D735,723 | S | * | 8/2015 | He | D14/422 |
| D736,709 | S | | 8/2015 | Byrne et al. | |
| D744,031 | S | | 11/2015 | Tanaka et al. | |
| 9,278,553 | B2 | | 3/2016 | Nakano et al. | |
| 9,301,031 | B2 | | 3/2016 | Gengler et al. | |
| D754,787 | S | | 4/2016 | Yoshioka et al. | |
| D757,164 | S | | 5/2016 | Hiraga | |
| 9,332,667 | B2 | | 5/2016 | Namba | |
| D761,903 | S | | 7/2016 | Matsumoto | |
| D765,772 | S | | 9/2016 | Clark, III et al. | |
| D766,359 | S | | 9/2016 | Takahashi | |
| D767,940 | S | | 10/2016 | Gross et al. | |
| D768,768 | S | * | 10/2016 | Takahashi | D18/50 |
| D770,565 | S | * | 11/2016 | Tanaka | D18/50 |
| D777,248 | S | * | 1/2017 | Oguchi | D18/50 |
| D781,955 | S | * | 3/2017 | Kim | D18/50 |
| D786,348 | S | * | 5/2017 | Mita | D18/56 |
| D786,964 | S | | 5/2017 | Clark, III et al. | |
| D792,508 | S | * | 7/2017 | Nakagawa | D18/50 |
| D795,338 | S | * | 8/2017 | Umezawa | D18/34.3 |
| 9,771,233 | B2 | * | 9/2017 | Miura | B65H 31/02 |
| D799,590 | S | * | 10/2017 | Dwyer | D18/50 |
| D799,593 | S | * | 10/2017 | Kim | D18/55 |
| D800,212 | S | * | 10/2017 | Nanno | D18/19 |
| D809,593 | S | | 2/2018 | Tashima | |
| D827,705 | S | * | 9/2018 | Gosselin | D18/34.3 |
| D849,834 | S | | 5/2019 | Gosselin et al. | |
| 2003/0180058 | A1 | | 9/2003 | Alegria et al. | |
| 2009/0310997 | A1 | | 12/2009 | Lee et al. | |
| 2011/0019347 | A1 | | 1/2011 | Imai | |
| 2013/0108317 | A1 | | 5/2013 | Tsuchiya | |

OTHER PUBLICATIONS

YouTube—Epilog Mini 18 laser engraver, announced Mar. 1, 2015 [online], [site visited Jul. 24, 2017]. 1 page. Available from internet, URL: <https://www.youtube.com/watch?v=EcyPL_3J8Mc>.

YouTube—Full Spectrum Laser Pro Series CO2, announced Jun. 28, 2016 [online], [site visited Jul. 24, 2017]. 1 page. Available from Internet, URL: <https://www.youtube.com/watch?v=gJthUfZHAOw>.

YouTube—Full Spectrum Muse Hobby Laser, announced May 6, 2017 [online], [site visited Jul. 24, 2017]. 1 page. Available from internet, URL: <https://www.youtube.com/watch?v=SEF6k-Zsl5A>.

YouTube—Meet the Glowforge, announced Sep. 24, 2015 [online], [site visited Jul. 24, 2017]. 1 page. Available from internet, URL: <https://www.youtube.com/watch?v=0R3mMUsHFvU>.

YouTube—Mr Beam's laser cutter, announced May 8, 2017 [online], [site visited Oct. 24, 2017]. 1 page. Available from internet, URL: <https://www.youtube.com/watch?v=8goXAmSncZE>.

* cited by examiner

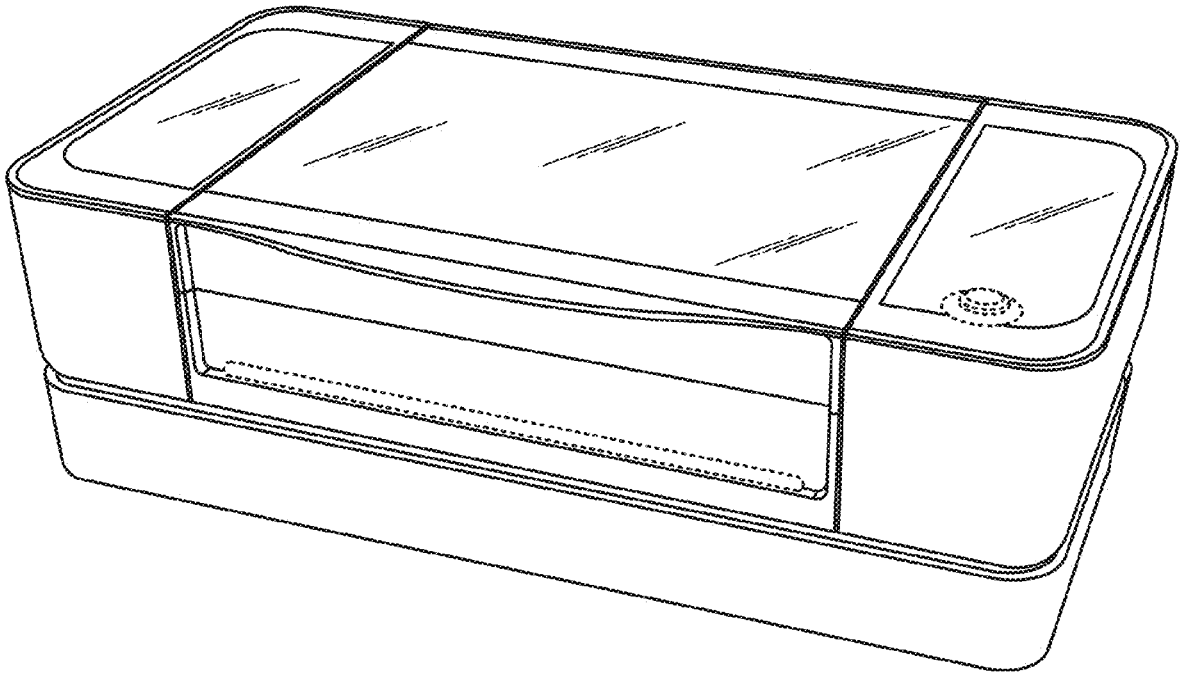
FIG. 1
(AMENDED)

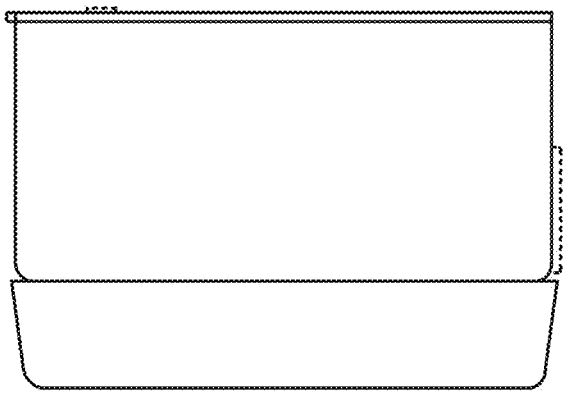
FIG. 2
(AMENDED)

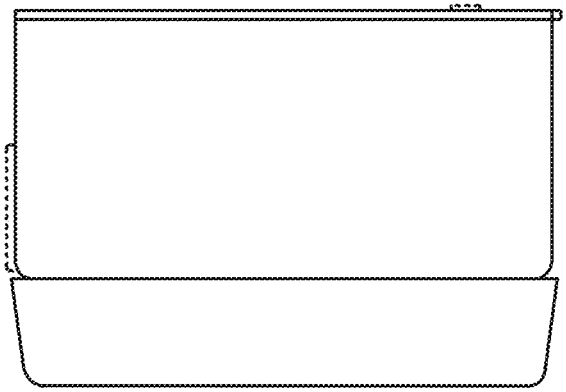
FIG. 3
(AMENDED)

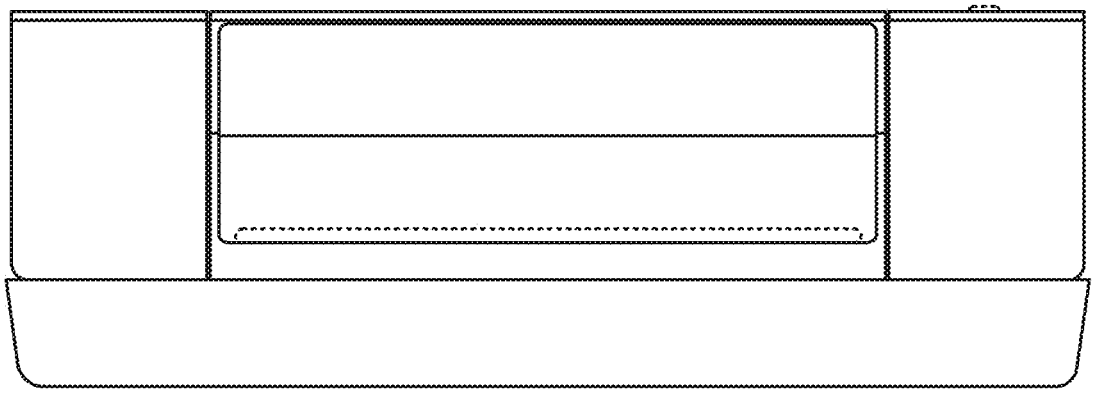
FIG. 4
(AMENDED)

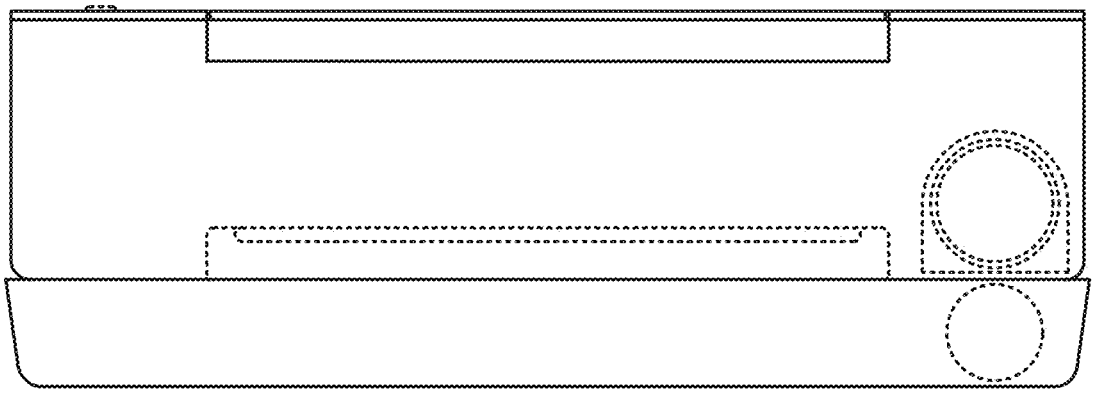
FIG. 5
(AMENDED)

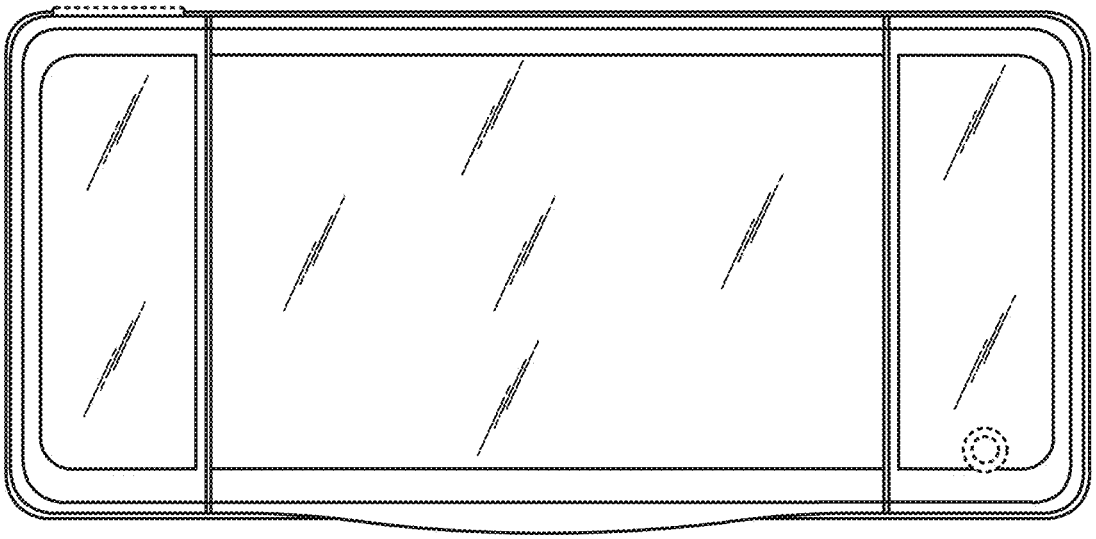
FIG. 6
(AMENDED)

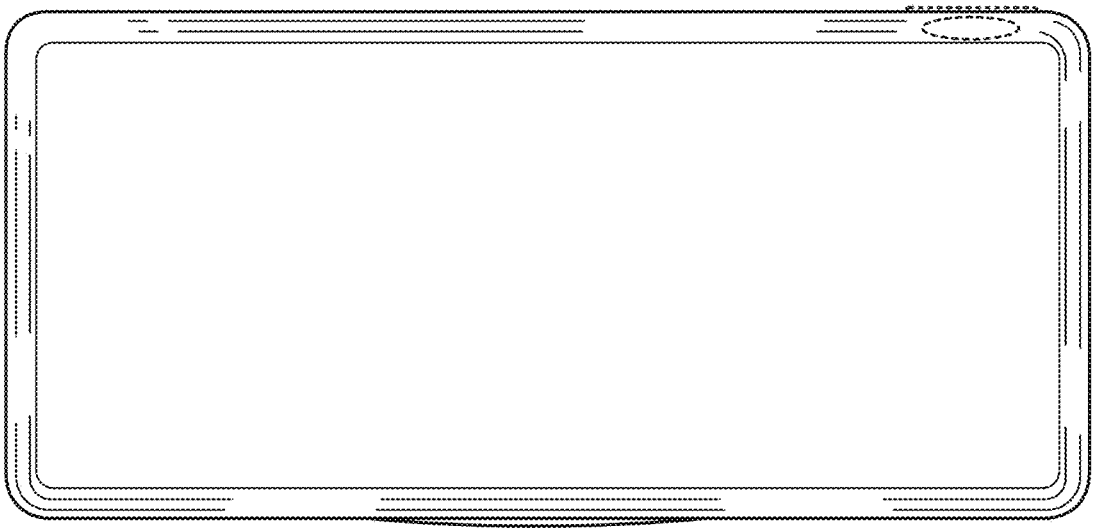
FIG. 7
(AMENDED)

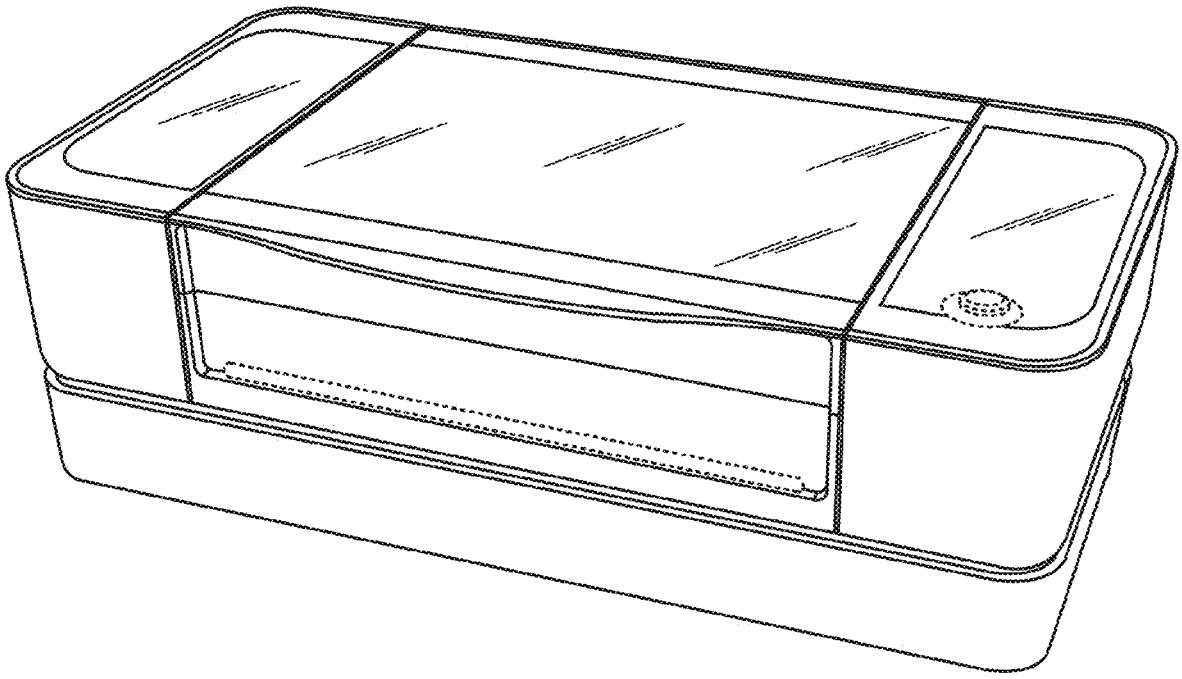
FIG. 8
(AMENDED)

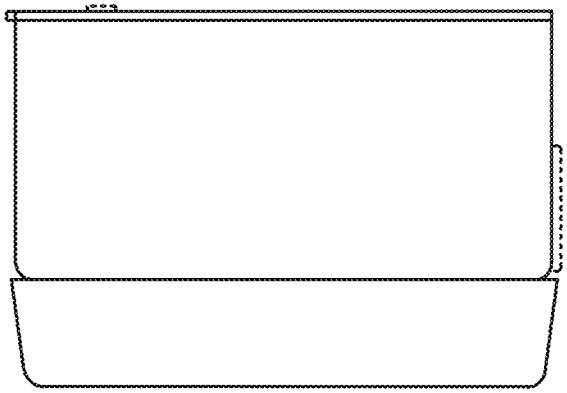
FIG. 9
(AMENDED)

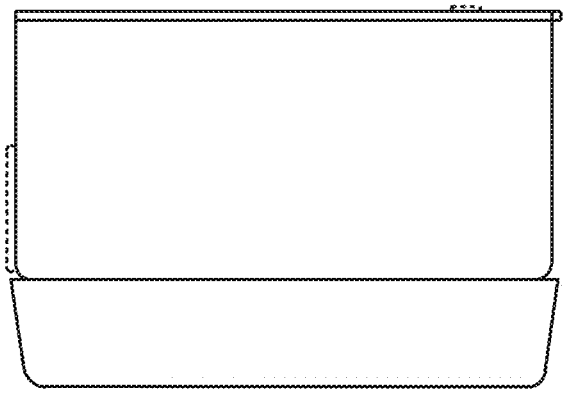
FIG. 10
(AMENDED)

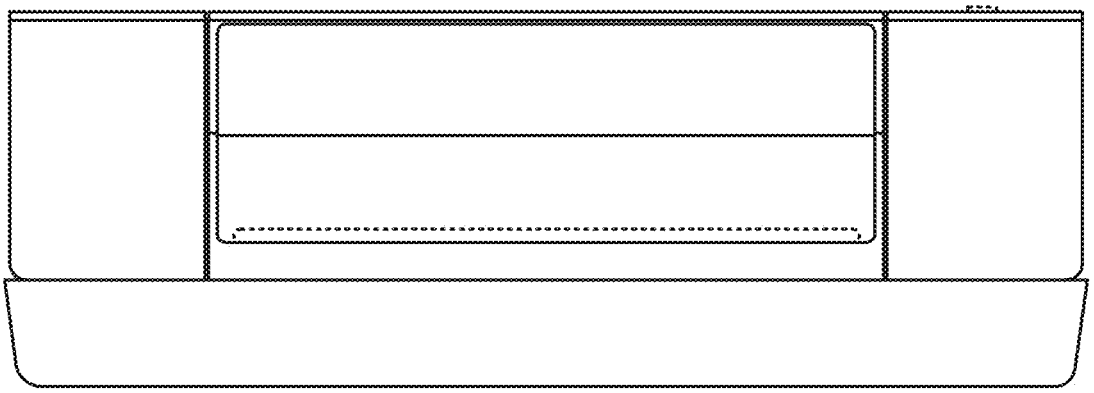
FIG. 11
(AMENDED)

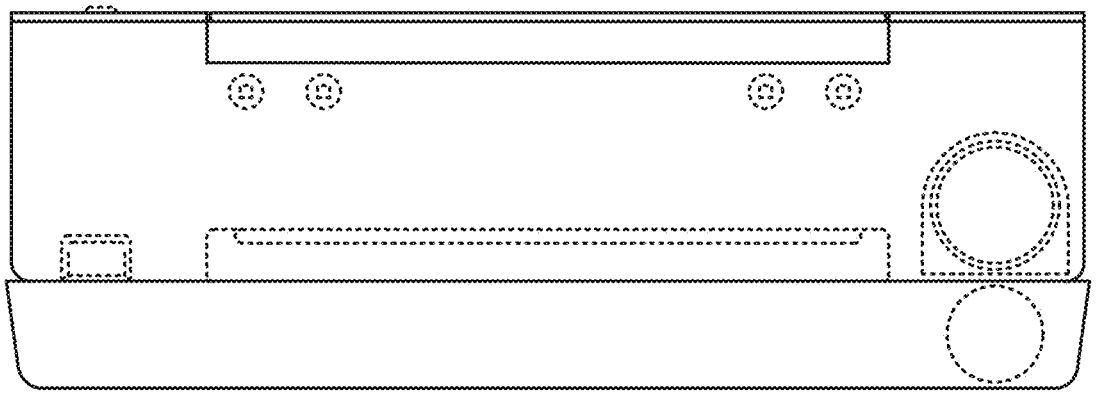
FIG. 12
(AMENDED)

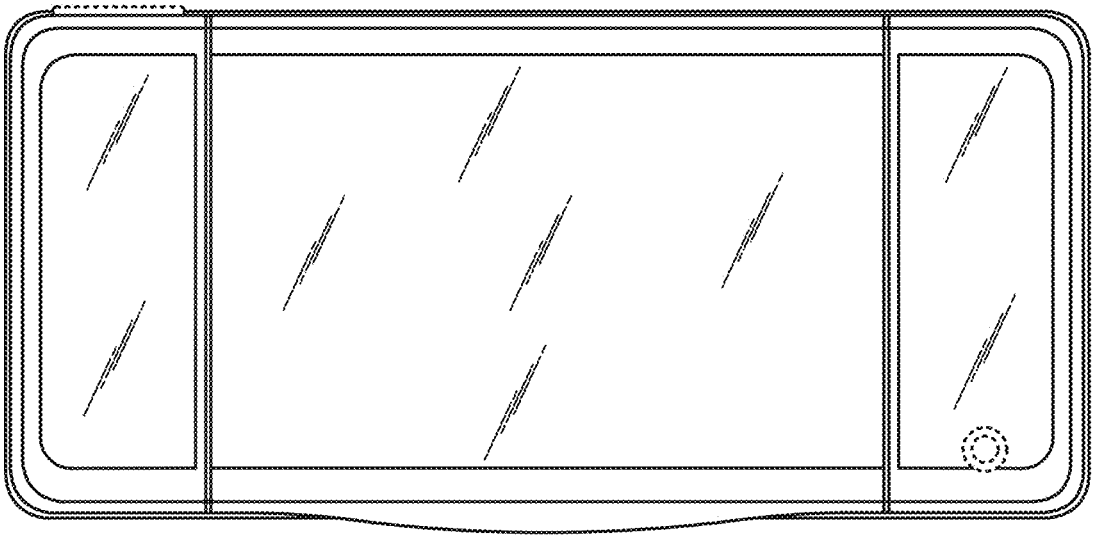
FIG. 13
(AMENDED)

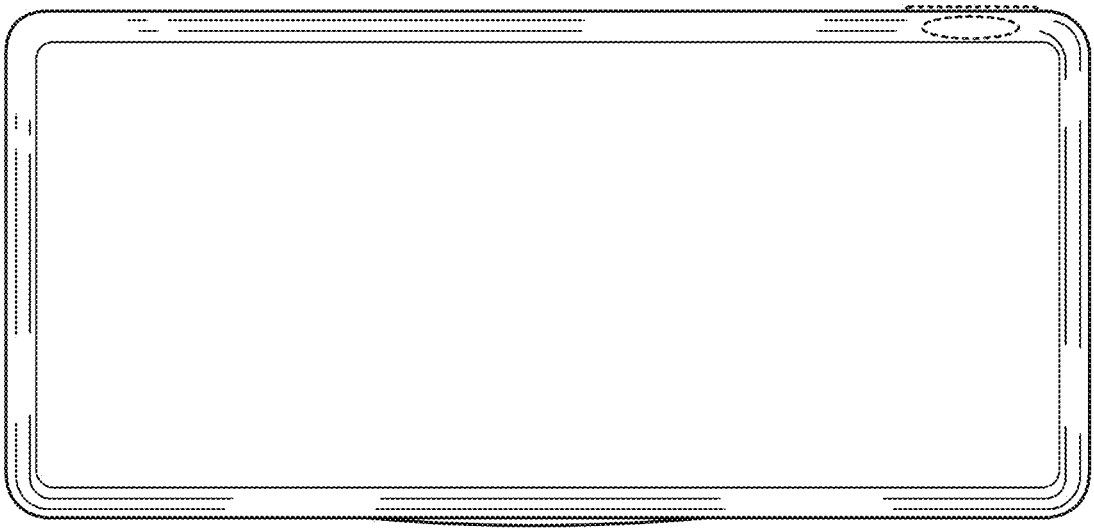
FIG. 14
(AMENDED)